US008986799B2

(12) United States Patent
Jackson et al.

(10) Patent No.: US 8,986,799 B2
(45) Date of Patent: Mar. 24, 2015

(54) CARGO TANK COATING

(75) Inventors: Paul Anthony Jackson, Durham (GB); Peter Robert Jones, Durham (GB)

(73) Assignee: Akzo Nobel Coatings International B.V., Arnhem (NL)

( * ) Notice: Subject to any disclaimer, the term of this patent is extended or adjusted under 35 U.S.C. 154(b) by 0 days.

(21) Appl. No.: 14/002,063

(22) PCT Filed: Mar. 5, 2012

(86) PCT No.: PCT/EP2012/053695
§ 371 (c)(1),
(2), (4) Date: Aug. 28, 2013

(87) PCT Pub. No.: WO2012/119968
PCT Pub. Date: Sep. 13, 2012

(65) Prior Publication Data
US 2013/0337203 A1  Dec. 19, 2013

Related U.S. Application Data

(60) Provisional application No. 61/474,858, filed on Apr. 13, 2011.

(30) Foreign Application Priority Data

Mar. 7, 2011 (EP) ..................................... 11157163

(51) Int. Cl.
| | | |
|---|---|---|
| B32B 1/02 | (2006.01) | |
| B32B 27/20 | (2006.01) | |
| B32B 27/26 | (2006.01) | |
| B32B 27/38 | (2006.01) | |
| C09D 163/04 | (2006.01) | |
| C08G 59/38 | (2006.01) | |
| C08G 59/50 | (2006.01) | |
| C08G 59/68 | (2006.01) | |
| C09D 163/00 | (2006.01) | |
| B32B 15/092 | (2006.01) | |

(52) U.S. Cl.
CPC .............. *C09D 163/00* (2013.01); *C08G 59/38* (2013.01); *C09D 163/04* (2013.01); *C08L 2205/02* (2013.01)
USPC .......... 428/34.1; 427/230; 427/239; 427/386; 428/413; 428/418; 523/427; 523/428

(58) Field of Classification Search
None
See application file for complete search history.

(56) References Cited

U.S. PATENT DOCUMENTS

| | | | |
|---|---|---|---|
| 3,592,946 A | | 7/1971 | Griffith |
| 4,210,704 A | * | 7/1980 | Chandross et al. ........... 428/414 |
| 4,356,505 A | * | 10/1982 | Lovinger et al. .............. 257/783 |
| 5,596,050 A | | 1/1997 | Gardner et al. |
| 5,599,628 A | | 2/1997 | Gardner |
| 2002/0006484 A1 | | 1/2002 | Ramalingam |
| 2006/0115641 A1 | | 6/2006 | Bowles et al. |

FOREIGN PATENT DOCUMENTS

| | | | |
|---|---|---|---|
| DE | 25 49 390 | 5/1976 | |
| EP | 0 601 668 | 6/1994 | |
| EP | 0 662 488 | 7/1995 | |
| EP | 0 872 505 | 10/1998 | |
| EP | 1 170 317 | 1/2002 | |
| JP | 58-103526 | 6/1983 | |
| JP | 59-59719 | 4/1984 | |
| JP | 62-161819 | 7/1987 | |
| JP | 63-225621 | 9/1988 | |
| JP | 3-149217 | 6/1991 | |
| JP | 4-348120 | 12/1992 | |
| JP | 6-16995 | 1/1994 | |
| JP | 06128356 A * | 5/1994 | ............ C08G 59/32 |
| JP | 2001-163955 | 6/2001 | |
| KR | 10-0962259 | 6/2010 | |
| WO | 80/02291 | 10/1980 | |
| WO | 90/08168 | 7/1990 | |
| WO | 95/26997 | 10/1995 | |
| WO | 02/16519 | 2/2002 | |
| WO | 2006/040336 | 4/2006 | |

OTHER PUBLICATIONS

Machine translation of JP 06128356 A, provided by the JPO website (no date).*
Research Disclosure, Dec. 2003, pp. 1257-1258.
John W. Muskopf et al., Ullmann Encyclopedia of Industrial Chemistry, 2002, Epoxy Resins, Chapter 3/3, 1.1, 3.2.
Sigma Phenguard Coating, Jan. 1998 (fact sheets) 7435/7436.
Database WPI, Week 199303, Thomson Scientific, London, GB, AN 1993-021868 (XP-002675477).
International Search Report and Written Opinion for PCT/EP2012/053695, mailed on May 25, 2012.
European Search Report for EP 11157163.4-2102, search completed on Aug. 9, 2011.
International Preliminary Report on Patentability for PCT/EP2012/053695, mailed on Feb. 1, 2013.

* cited by examiner

*Primary Examiner* — Michael J Feely
(74) *Attorney, Agent, or Firm* — Kenyon & Kenyon LLP

(57) ABSTRACT

The invention relates to compositions that can be used as coatings for the inner lining of cargo tanks. The compositions comprise a mixture of epoxy resins, a curing agent, an accelerator or mixture of accelerator(s), and one or more filler(s) or pigment(s), wherein the mixture of epoxy resins comprises 60-80 wt. % of an RDGE epoxy resin and 20-40 wt. % of an epoxy novolac resin, wherein the wt. % is based upon the total weight of the mixture of epoxy resins.

20 Claims, No Drawings

CARGO TANK COATING

REFERENCE TO RELATED APPLICATIONS

This application is the U.S. National Phase of PCT/EP2012/053695 filed on Mar. 5, 2012, and claims the benefit of EP Application No. 11157163.4, filed on Mar. 7, 2011, and U.S. Provisional Application No. 61/474,858, filed on Apr. 13, 2011.

The present invention relates to compositions that can be used as a coating for the interior of tanks that are used to transport liquid bulk chemicals, either on land or by sea.

Worldwide, more than 5000 liquid bulk chemicals are transported, normally in special cargo tanks. These chemicals vary from being completely harmless to very aggressive to steel and or other materials that are used to make these cargo tanks. Normally, these cargo tanks are coated with a lining. This tank lining fulfills two key functions, they protect the cargo hull (normally steel) from the cargo (corrosion risk) and they protect the cargo from the cargo hull (contamination risk).

The correct choice of tank coating systems can have a significant impact on the earnings potential of the vessel, affecting both the range of cargoes the vessel can carry and operational matters, such as vessel turn-around time and ease of tank cleaning.

Non-metallic tank linings can be based on epoxy coating technology. In particular coatings based on low viscosity epoxy compounds can be used.

For example, tank lining coatings are known based on epoxy novolac resins, and coatings based on RDGE (resorcinol diglycidyl ether) epoxy resins. Similar coating systems are also described in WO 90/08168 and US 20020006484.

It was found that for tank lining coatings based on epoxy novolac resins, absorption can occur of various of the bulk chemicals that can be transported in cargo tanks. It was also found that coatings based on epoxy novolac resins can fail when exposed to cyclic loading with various types of bulk chemicals. The same problem, albeit to a lesser extent, was found in tank lining coatings based on RDGE-epoxy resins.

In KR962259 a water soluble epoxy resin composition is disclosed that can be used in paint. This composition contains a bisphenol A or bisphenol F type epoxy resin and a reactive diluents. The reactive diluent can be selected from a large group of glycidyl ethers, which includes resourcinol diglycidyl ether. No mention or suggestion is made to use this paint as a lining for a cargo tank.

There is a clear need for an improved tank lining coating that can be used for a wide range of bulk chemicals and that is also resistant to cyclic loading.

Surprisingly a composition was found that can be used as a coating for the lining of cargo tanks that shows both a very low absorption for the liquid chemicals that are transported in cargo tanks and that can also withstand the cyclic loading with various types of bulk chemicals.

In one embodiment of the invention, the composition is a coating composition comprising:
 a. a mixture of epoxy resins,
 b. a curing agent,
 c. an accelerator or a mixture of accelerators, and
 d. one or more fillers or pigments,
 characterised in that the mixture of epoxy resins comprises 60-80 wt. % of an RDGE epoxy resin and 20-40 wt. % of an epoxy novolac resin, wherein the wt. % is based upon the total weight of the mixture of epoxy resins.

In one embodiment, at least one of the accelerators speeds up the homopolymerisation reaction between the epoxy groups of the epoxy resins. Suitably, at least one of the accelerators also speeds up the curing reaction between the epoxy groups of the epoxy resins and the functional groups having an active hydrogen of the curing agent.

The composition according to the present invention comprises a mixture of epoxy resins. This mixture comprises 60-80 wt. % of an RDGE epoxy resin and 20-40 wt. % of an epoxy novolac resin, wherein the wt. % is based upon the total weight of the mixture of epoxy resins.

In a further embodiment, the mixture comprises 70-80 wt. % of an RDGE epoxy resin and 20-30 wt. % of an epoxy novolac resin, wherein the wt. % is based upon the total weight of the mixture of epoxy resins.

An RDGE epoxy resin that can be used in the composition in accordance with the present invention is normally a low viscosity epoxy compound with an epoxy equivalent weight of 120-135 g/eq.

Examples of a suitable epoxy novolac resin that can be used in the composition in accordance with the present invention include DEN 431 and DEN 438 (ex DOW Chemicals). These epoxy compounds have an epoxy equivalent weight in the range of 172-181 g/eq.

The epoxy equivalent weight is the weight of the epoxy resin required to yield one mole (or one equivalent) of epoxy functional groups.

As epoxy resins are electrophilic in nature, they commonly react with nucleophiles. The curing agents, of this invention, comprise nucleophilic functional groups that react with epoxy groups. During the ring-opening reaction of an epoxide with a nucleophile (nucleophilic functional groups), a hydrogen atom is transferred from the nucleophile to the oxygen atom of the epoxide. This transferred hydrogen atom is referred to as the "active hydrogen".

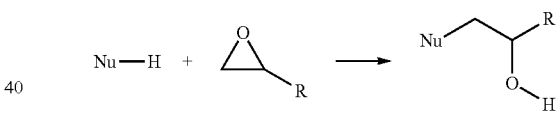

It is common therefore to quote the equivalent weight of the nucleophilic species in terms of the active hydrogen equivalent weight. This is simply the weight of nucleophilic species required to yield one mole (or one "equivalent") of hydrogen atoms transferable to the ring opened epoxy. The active hydrogen equivalent weight of the amine curing agent is therefore the weight of the curing agent to give one mole (or one "equivalent") of N—H groups.

A primary amine curing agent, for example, would have two active hydrogens as it can react with two epoxide groups.

Examples of (nucleophilic) functional groups on a curing agent having an active hydrogen include amines (primary and secondary amines), thiols, carboxylic acids, anhydrides and alcohols such a phenols.

It is understood by the inventors that the coating composition of the current application cures by a dual-cure mechanism/process. By dual-cure we mean that the coating composition cures via two mechanisms: (1) by reaction of the epoxy groups of the epoxy resins with the functional groups having an active hydrogen in the curing agent, and (2) by reaction between just the epoxy groups of the epoxy resins (this is sometimes called "epoxy homopolymerisation").

The dual-cure process is believed to result in the cured film having a higher crosslink density than is achievable through single-cure process alone, the higher cross link density being beneficial due to a reduction in the absorption of liquid cargo into the cured coating.

The coating composition according to the present invention may have the form of a 1-pack or a 2-pack composition, most suitably a 2-pack composition.

A 2-pack composition will contain a curing agent in a separate pack. Hence, pack 1 will contain the epoxy resin mixture, pack 2 the epoxy-reactive curing agent and the accelerators.

The curing agent (i.e. the "epoxy-reactive curing agent") that is present in the composition can be any curing agent commonly known as a curing agent for epoxy resins. Examples are phenol resin curing agents, polyamine curing agents, polythiol curing agents, polyanhydride curing agents, and polycarboxylic acid curing agents, with polyamine curing agents being preferred.

Examples of phenol resin curing agents are phenol novolac resin, bisphenol novolac resin, and poly p-vinylphenol.

Examples of polyamine curing agents are diethylene triamine, triethylene tetramine, tetraethylene pentamine, dicyandiamide, polyamide-amine, polyamide resin, ketimine compounds, isophorone diamine, m-xylene diamine, m-phenylene diamine, 1,3-bis(aminomethyl)cyclohexane, bis(4-aminocyclohexyl)methane, N-aminoethyl piperazine, 4,4'-diaminodiphenyl methane, 4,4'-diamino-3,3'-diethyl-diphenyl methane, and diaminodiphenyl sulfone, phenalkamine, mannich bases. Commercial grade quality curing agents of any of these polyamines may be used. Adducts of any of these amines can also be used. Such adducts can be prepared by reaction of the amine with a suitably reactive compound such as an epoxy resin. This will reduce the free amine content of the curing agent, making it more suitable for use under conditions of low temperature and/or high humidity.

Examples of polycarboxylic acid curing agents include phthalic anhydride, tetrahydrophthalic anhydride, methyltetrahydrophthalic anhydride, 3,6-endomethylenetetrahydrophthalic anhydride, hexachloroendomethylenetetra-hydrophthalic anhydride, and methyl-3,6-endomethylenetetrahydrophthalic anhydride.

In a preferred embodiment of the invention, the curing agent is a polyamine curing agent.

In an embodiment of the invention, the amount of curing agent present in the coating composition is preferably such that the equivalent ratio (i.e. mole ratio) of active hydrogens in the curing agent to the epoxy groups of epoxy resin mixture is between about 0.2 and 0.6, most preferably between about 0.2 and about 0.4. This ratio of active hydrogen to epoxy groups enables the coating composition to cure effectively via a dual cure process.

In a preferred embodiment of the invention the curing agent is a polyamine curing agent, and the amount of polyamine curing agent present in the coating composition is preferably such that the equivalent ratio (i.e. mole ratio) of active hydrogens to epoxy groups is between about 0.2 and 0.6, most preferably between about 0.2 and about 0.4.

In one embodiment of this invention, when the curing agent comprises functional groups each having one active hydrogen, then the amount of curing agent present in the coating composition is such that the equivalent ratio of the functional groups having an active hydrogen in the curing agent to the epoxy groups of epoxy resin mixture is between about 0.2 and 0.6, preferably between about 0.2 and 0.4.

Advantageously, when the curing agent is a polyamine curing agent, the cure between the epoxy and amine groups can be carried out at ambient temperatures, for example temperatures in the range from 0 to 50° C.

When the coating composition comprises a polyamine curing agent, and it is formulated so that the equivalent/mole ratio of epoxy: active hydrogen is between 1:0.2-0.6 (preferably 1:0.2-0.4), the coating composition is able to dry and harden due to the cure of the epoxy and amine groups under ambient conditions (e.g. 0° C.-50° C.) to the extent that water can be sprayed on to the coating or the coating can be physically handled without disrupting the coating surface. Subsequent heating of this coating, for example, to a temperature of 50° C. up to 80° C. or 100° C. or 130° C. or more (such as 60° C.-80° C.) will cause homopolymerisation of the epoxy groups. Such heating of the coating can be achieved in several ways, for example by (a) contact of the coated surface with a hot cargo, (b) hot air heating of the coated surface, or (c) spraying of the coated surface with hot water. To achieve homopolymerisation, preferably an accelerator that promotes homopolymerisation (typically imidazole) should be present.

Accelerators that speed up the homopolymerisation reaction, generally also speed up the reaction between the epoxy groups of the epoxy resin and functional groups of the curing agent having an active hydrogen.

Examples of accelerators known to speed up the curing reaction between an epoxy resin and the curing agent include the following alcohols, phenols, carboxylic acids, sulphonic acids, and salts:

Alcohols: Ethanol, 1-propanol, 2-proanol, 1-butanol, 2-butanol, t-butanol, benzyl alcohol, furfuryl alcohol, and other alkyl alcohols, propanediol, butanediol, glycerol and other polyhydric alcohols, triethanolamine, tri-isopropanolamine, dimethylaminoethanol and other β-hydroxy tertiary amines.

Phenols: Phenol, 2-chlorophenol, 4-chlorophenol, 2,4-dichlorophenol, 2,4,6-trichlorophenol, 2-nitrophenol, 4-nitrophenol, 2,4-dinitrophenol, 2,4,6-trinitrphenol, 4-cyanophenol, o-cresol, m-cresol, p-cresol, 4-ethylphenol, 4-isopropylphenol, 2,4-dimethylphenol, 3,5-dimethylphenol, nonyl phenol, eugenol, isoeugenol, cardanol and other alkylated phenols, 2,2'-dihydroxybiphenyl, 2,4'-dihydroxybiphenyl, 4,4'-dihydroxybiphenol, bisphenol A, bisphenol F, catechol, 4-t-butyl catechol, resorcinol, 4-hexylresorcinol, orcinol, hydroquinone, naphthalenediol, anthracenediol, biphenylenediol and other substituted dihydric phenols, phloroglucinol, phloroglucide, calixarene, poly(4-vinylphenol) and other polyhydric phenols.

Carboxylic acids: acetic acid, propanoic acid, butyric acid, lactic acid, phenyl acetic acid and other alkyl carboxylic acids, malonic acid, oxalic acid, maleic acid, fumaric acid and other dibasic acids or their monoesters, benzoic acid, 4-t-butyl benzoic acid, salicylic acid, 3,5-dichlorosalicylic acid, 4-nitrobenzoic acid and other aromatic acids.

Sulphonic acids: Methanesulphonic acid and other alkyl sulphonic acid, p-toluenesulphonic acid, 4-dodecylbenzenesulphonic acid, and other aromatic sulphonic acids, naphthalene disulphonic acid, di-nonyl naphthalene disulphonic acid and other polyhydric sulphonic acids Salts: Calcium nitrate, calcium naphthenate, ammonium thiocyanate, sodium thiocyanate, potassium thiocyanate, imidazolinium thiocyanate, lithium tetrafluoroborate, lithium bromide, lithium trifluoroacetate, calcium chloride, ytterbium triflate, lithium perchlorate, zinc triflate, lithium nitrate. For all these salts, the cation could be interchanged with lithium, sodium or potassium.

Examples of suitable homopolymerisation accelerators are tertiary amines, like 1,8-diaza-bicyclo[5.4.0]undec-7-ene, triethylene diamine, benzyldimethylamine, triethanolamine, dimethylaminoethanol, and tris(dimethylaminomethyl)phenol; imidazoles like 1-methylimidazole, 2-methylimidazole, 2-phenylimidazole, 2-phenyl-4-methylimidazole, 2-ethyl-4-methyl imidazole and 2-heptadecylimidazole and diazabycyclo octane. These homopolymerisation accelerators also speed up the cure between the epoxy groups of the epoxy resins and the functional groups of the curing agent having an active hydrogen.

Preferred accelerators in the context of this application include, tertiary amines, like 1,8-diaza-bicyclo[5.4.0]undec-7-ene, triethylene diamine, benzyldimethylamine, triethanolamine, dimethylaminoethanol, and tris-(dimethylaminomethyl)phenol; imidazoles like 1-methylimidazole, 2-methylimidazole, 2-phenylimidazole, 2-phenyl-4-methylimidazole, 2-ethyl-4-methyl imidazole and 2-heptadecylimidazole and diazabycyclo octane, optionally in combination with one or more of: nonyl phenol; salicylic acid; diazabycyclo octane; calcium nitrate.

The accelerator(s) are suitably used in an amount of 0.1 to 5 parts by weight relative to 100 parts by weight of the epoxy resin mixture.

In the 2-pack composition, the accelerator(s) must be present in pack 2 (containing the amine curing agent). It is not recommended that the accelerator(s) are present in pack 1 (containing the epoxy resin mixture) as this would confer too short a shelf life.

The coating composition of the invention comprises one or more pigments and/or fillers. The one or more pigments may be coloring pigments for example titanium dioxide (white pigment), coloured pigments such as yellow or red iron oxide or a phthalocyanine pigment. The one or more pigments may be strengthening pigments such as micaceous iron oxide, crystalline silica and wollastonite. The one or more pigments may be anticorrosive pigments such as zinc phosphate, molybdate or phosphonate. The one or more pigments may be a filler pigment such as barytes, talc, feldspar, or calcium carbonate.

The composition may contain one or more further ingredients, for example a thickening agent or thixotrope such as fine-particle silica, bentonite clay, hydrogenated castor oil, or a polyamide wax. The composition may also contain a plasticiser, pigment dispersant, stabiliser, flow aid, adhesion promotor, or thinning solvent.

The compositions of the invention may be cured at ambient temperatures, or at elevated temperatures (with the use of IR lamps), for example temperatures from 50° C. to 80° C. up to 100 or 130° C., to speed up the curing.

The compositions of the invention are in particular suited for use as coatings for the lining of cargo tanks. The coating composition can be applied directly to surface of the cargo tank as a primer/finish, i.e. the composition can be used as the only type of protective coating on a substrate.

Therefore, also within the scope of the present invention is (i) the use of the coating composition as described above as a primer/finish, (ii) a surface of a cargo tank coated with the coating compositions as described above, and (iii) a method of coating a surface of a cargo tank by applying to said surface, a coating composition as described above, and allowing the coating composition to cure under ambient conditions (up to 50° C.), and optionally heating the coated surface to temperatures ranging from 50° C. to 80° C. up to 100 or 130° C.

The invention will now be elucidated with reference to the following examples. These are intended to illustrate the invention but are not to be construed as limiting in any manner the scope thereof.

EXAMPLES 1-2

Two different types of cargo lining were prepared by mixing the ingredients as indicated in the table 1 below:

TABLE 1

Composition of the compositions

|  | Example 1 | Example 2 |
|---|---|---|
| RDGE resin | 27.9 | 18.3 |
| Epoxy Novolac resin | 8.6 | 18.3 |
| Thixotrope | 2.1 | 2.1 |
| BaSO$_4$ | 25.8 | 25.8 |
| TiO$_2$ | 3.7 | 3.7 |
| Carbon black | 0.1 | 0.1 |
| Feldspat | 15 | 15 |
| Xylene | 9.3 | 9.3 |
| Aliphatic amine curing agent | 5.2 | 5.2 |
| Imidazole catalyst | 1.5 | 1.5 |
| Tertiary amine catalyst | 0.7 | 0.7 |

All ingredients were thoroughly mixed in a blender at room temperature. The curing agent and catalyst were prepared separately from the other ingredients. The curing agent/catalyst mixture was added to the other components shortly before application of the composition to the substrate.

In addition to these two coatings, in parallel two commercially available types of tank lining coatings were tested, viz. Interline 994 (available from International Paint) and APC Marineline (available from Advanced Polymer Coatings). Interline 994 is a coating for tank linings based on an epoxy novolac resin, APC Marineline is a coating for tank linings based on an RDGE epoxy resin.

The different types of cargo lining coating composition were applied to steel panels. The coating composition was allowed to cure at 23° C. until hard dry (epoxy-amine cure). The panels were then post-cured by placing in an oven at 80° C. for 16 hours (homopolymerisation cure). The coated panels were put inside steel containers, and the steel containers were then sequentially filled with liquid cargos in the sequence indicated in Table 2. After each cycle, the steel panel was inspected for damages and/or discoloration and allowed to ventilate prior to the start of the next cycle. The steel panels weren't washed during testing, but if heavily contaminated following ventilation they would be wiped clean.

For a successful pass of a cycle, a score was noted of 1 point. If a failure of a coating was observed, a test was stopped. The scores of the different types of coatings is listed in Table 3. In this table, a score of 20 indicates that the coating past all cycles of the test without any severe structural damage to the coating, such as blistering. A score of 5 for a test indicates that the test was stopped after cycle 5 due to severe structural damage to the coating.

TABLE 2

Overview of test cycles

| | Test no | | | | | | | | | |
|---|---|---|---|---|---|---|---|---|---|---|
| Cycle | 1 | 2 | 3 | 4 | 5 | 6 | 7 | 8 | 9 | 10 |
| 1 | MA | MeOH | DCM | AA | VAM | 50FW | TCE | EEA | AC | MeAc |
| 2 | BE | AC | XY | DCM | AA | MeOH | CIE | 50% NaOH | MA | 50FW |
| 3 | CIE | VAM | AA | 20% NaOH | MeAc | 50FW | EtAc | MeOH | DCM | EDC |
| 4 | CH | TCE | TOL | HMDA | DCM | VAM | 50FW | 50% NaOH | EDC | MeOH |
| 5 | AC | MeAc | HMDA | 50% NaOH | TCE | 50FW | MA | BuOH | 50FW | AA |
| 6 | MEG | CIE | SSA | 50FW | EDC | AC | 50FW | VAM | EtAc | DCM |
| 7 | 50FW | EDC | GAA | AA | EEA | CIE | MeOH | TCE | 20% NaOH | VAM |

TABLE 2-continued

Overview of test cycles

| Cycle | Test no 1 | 2 | 3 | 4 | 5 | 6 | 7 | 8 | 9 | 10 |
|---|---|---|---|---|---|---|---|---|---|---|
| 8 | MEG | MeOH | MTBE | CIE | AC | EDC | 50FW | AA | 50FW | 20% NaOH |
| 9 | XY | MA | AN | EDA | DCM | 50FW | EEA | EDC | MeOH | MeAc |
| 10 | DEA | AC | BuOH | VAM | EtAc | MeOH | CIE | 50FW | 70% HMDA | Dilute HCl |
| 11 | MA | MeOH | DCM | | VAM | 50FW | TCE | EEA | AC | |
| 12 | MeOH | AC | XY | | AA | MeOH | CIE | 50FW | MA | |
| 13 | VAM | BA | AA | | MeAc | 50FW | EtAc | MeOH | DCM | |
| 14 | EEA | TCE | TOL | | MeOH | VAM | 50FW | MeAc | EDC | |
| 15 | TCE | MeAc | HMDA | | EDC | 50FW | MA | MeOH | 50FW | |
| 16 | MeAc | CIE | SSA | | TCE | MiBK | MeOH | AA | EtAc | |
| 17 | AC | EDC | MeOH | | EEA | CIE | MiBK | TCE | 50FW | |
| 18 | MeOH | MeOH | MTBE | | AC | EDC | 50FW | HMDA | MeOH | |
| 19 | MiBK | MA | MeOH | | MeAc | 50FW | EEA | VAM | EDC | |
| 20 | EDC | AC | BuOH | | EtAc | MA | CIE | 50FW | 50FW | |

50FW = 50° C. Freshwater
AA = Acetic Anhydride
AC = Acetone
AN = Acrylonitrile
BA = Benzyl Alcohol
BE = Benzene
BuOH = Butanol
Cellosolve = Ethoxy Ethanol
CH = Cyclohexane
CIE = Crude Industrial Ethanol (90:10 Ethanol/Water)
DCM = Dichloromethane
DEA = Diethanolamine
EDA = Ethylene Diamine
EDC = Ethylene Dichloride
EEA = Ethoxy ethyl Acetate (Cellosolve Acetate)
EtAc = Ethyl Acetate
GAA = Glacial Acetic Acid
HMDA = 70% Hexamethylane Diamine
MA = Methyl Acrylate
MeAc = Methyl Acetate
MeOH = Methanol
MiBK = Methyl-iso-Butyl ketone
MTBE = Methyl tertiary-Butyl Ether
NaOH = Sodium Hydroxide (50% solution in Water)
SSA = Trimethylbenzene (Naphthalene Distillate, Shellsol 'A')
TCE = Trichloroethylene
TOL = Toluene
VAM = Vinyl Acetate Monomer
XY = Xylene

TABLE 3

Scoring results in test cycles

| Test no | 75/25 mix Example 1 | 50/50 mix Example 2* | 100% novolac Interline 994* | 100% RDGE APC Marineline* |
|---|---|---|---|---|
| 1 | 20 | 20 | 20 | 20 |
| 2 | 20[1] | 20[1] | 2 | 20[1] |
| 3 | 20[1] | 14 | 1 | 20[1] |
| 4 | 9 | 9 | 3 | 6 |
| 5 | 20[1] | 14 | 9 | 20[1] |
| 6 | 20 | 13 | 5 | 13 |
| 7 | 20 | 18 | 14 | 20 |
| 8 | 20[1] | 20[1] | 12 | 20[1] |
| 9 | 20 | 17 | 11 | 8 |
| 10 | 10[1] | 10[1] | 8 | 10[1] |
| Total score | 179 | 155 | 85 | 157 |

*Comparative example
[1](some) discoloration observed

EXAMPLE 3

The cargo lining coating of having the same composition of Example 1 above was prepared in the same way as described above.

In addition to this coating, in parallel two commercially available types of tank lining coatings were tested, viz. Interline 994 (available from International Paint) and APC Marineline (available from Advance Polymer Coatings). Interline 994 is coating for tank linings based on an epoxy novolac resin, APC Marineline is a coating for tank linings based on an RDGE epoxy resin.

The different types of cargo lining coating were applied to steel panels. The coating composition was allowed to cure at 23° C. until hard dry (epoxy-amine cure). The panels were then post-cured by placing in an oven at 80° C. for 16 hours (homopolymerisation cure). The coated panels were put inside steel containers, and the steel containers were then sequentially filled with liquid cargos in the sequence indicated in Table 5. After each cycle, the steel panel was inspected for damages and/or discoloration and allowed to ventilate prior to the start of the next cycle. The steel panels weren't washed during testing, but if heavily contaminated following ventilation they would be wiped clean.

For a successful pass of a cycle, a score was noted of 1 point. If a failure of a coating was observed, a test was stopped. The scores of the different types of coatings is listed in Table 6. In this table, a score of 30 indicates that the coating past all cycles of the test without any severe structural damage to the coating, such as blistering. A score of 5 for a test indicates that the test was stopped after cycle 5 due to severe structural damage to the coating.

TABLE 5

Overview of test cycles

| Cycle | Test no 1 | 2 | 3 | 4 | 5 | 6 | 7 | 8 | 9 | 10 |
|---|---|---|---|---|---|---|---|---|---|---|
| 1 | MA | MeOH | DCM | AA | VAM | 50FW | TCE | EEA | AC | MeAc |
| 2 | BE | AC | XY | DCM | AA | MeOH | CIE | 50% NaOH | MA | 50FW |
| 3 | CIE | VAM | AA | 20% NaOH | MeAc | 50FW | EtAc | MeOH | DCM | EDC |
| 4 | CH | TCE | TOL | HMDA | DCM | VAM | 50FW | 50% NaOH | EDC | MeOH |
| 5 | AC | MeAc | HMDA | 50% NaOH | TCE | 50FW | MA | BuOH | 50FW | AA |
| 6 | MEG | CIE | SSA | 50FW | EDC | AC | 50FW | VAM | EtAc | DCM |
| 7 | 50FW | EDC | GAA | AA | EEA | CIE | MeOH | TCE | 20% NaOH | VAM |
| 8 | MEG | MeOH | MTBE | CIE | AC | EDC | 50FW | AA | 50FW | 20% NaOH |
| 9 | XY | MA | AN | EDA | DCM | 50FW | EEA | EDC | MeOH | MeAc |
| 10 | DEA | AC | BuOH | VAM | EtAc | MeOH | CIE | 50FW | 70% HMDA | Dilute HCl |
| 11 | MA | MeOH | DCM | | VAM | 50FW | TCE | EEA | AC | |
| 12 | MeOH | AC | XY | | AA | MeOH | CIE | 50FW | MA | |
| 13 | VAM | BA | AA | | MeAc | 50FW | EtAc | MeOH | DCM | |
| 14 | EEA | TCE | TOL | | MeOH | VAM | 50FW | MeAc | EDC | |
| 15 | TCE | MeAc | HMDA | | EDC | 50FW | MA | MeOH | 50FW | |
| 16 | MeAc | CIE | SSA | | TCE | MiBK | MeOH | AA | EtAc | |
| 17 | EDC | EDC | MeOH | | EEA | CIE | MiBK | TCE | 50FW | |
| 18 | MeOH | MeOH | MTBE | | AC | EDC | 50FW | HMDA | MeOH | |
| 19 | MiBK | MA | MeOH | | MeAc | 50FW | EEA | VAM | EDC | |
| 20 | EDC | AC | BuOH | | EtAc | MA | CIE | 50FW | 50FW | |
| 21 | MA | MeOH | MeAc | | VAM | 50FW | TCE | EEA | AC | |
| 22 | MeOH | AC | XY | | AA | MeOH | CIE | 50FW | MA | |
| 23 | VAM | BA | AA | | MeAc | 50FW | EtAc | MeOH | HMDA | |
| 24 | EEA | TCE | TOL | | MeOH | VAM | 50FW | MeAc | EDC | |
| 25 | TCE | MeAc | HMDA | | EDC | 50FW | MA | MeOH | | |
| 26 | MA | CIE | SSA | | TCE | MiBK | MeOH | AA | | |
| 27 | AC | EDC | MeOH | | EEA | CIE | SSA | TCE | | |
| 28 | MeOH | MeOH | MTBE | | AC | EDC | HMDA | 50FW | | |
| 29 | CIE | MA | MeOH | | VAM | 50FW | EEA | EDC | | |
| 30 | EDC | AC | BuOH | | MeAc | MA | CIE | 50FW | | |

TABLE 6

Scoring results in test cycles

| Test no | 75/25 mix Example 3 | 100% novolac Interline 994* | 100% RDGE APC Marineline* |
|---|---|---|---|
| 1 | 30 | 22 | 30 |
| 2 | 30[1] | 2 | 30[1] |
| 3 | 30[1] | 1 | 30[1] |
| 4 | 9 | 3 | 6 |
| 5 | 30[1] | 9 | 30[1] |
| 6 | 30 | 5 | 13 |
| 7 | 30 | 14 | 18 |
| 8 | 28[1] | 12 | 28[1] |
| 9 | 24 | 11 | 8 |
| 10 | 10[1] | 8 | 10[1] |
| Total score | 251 | 87 | 203 |

*Comparative example
[1](some) discoloration observed

The invention claimed is:

1. A coating composition comprising:
    a. a mixture of epoxy resins;
    b. a curing agent;
    c. an accelerator or a mixture of accelerators; and
    d. one or more filler(s) or pigment(s);
    wherein the mixture of epoxy resins comprises 60 to 80 weight % of an RDGE epoxy resin and 20 to 40 weight % of an epoxy novolac resin, wherein the weight % is based upon the total weight of the mixture of epoxy resins; and
    wherein the amount of curing agent present in the coating composition is such that the equivalent ratio of active hydrogens in the curing agent to the epoxy groups of the mixture of epoxy resins is between about 0.2 and 0.6.

2. The coating composition of claim 1, wherein the curing agent is an amine curing agent.

3. The coating composition of claim 2, wherein the amount of curing agent present in the coating composition is such that the equivalent ratio of active hydrogens in the curing agent to the epoxy groups of the mixture of epoxy resins is between about 0.2 and 0.4.

4. A cargo tank coated with the coating composition of claim 3.

5. The coating composition of claim 1, wherein the amount of curing agent present in the coating composition is such that the equivalent ratio of active hydrogens in the curing agent to the epoxy groups of the mixture of epoxy resins is between about 0.2 and 0.4.

6. The coating composition of claim 5, wherein the curing agent is a polyamine curing agent.

7. The coating composition of claim 1, wherein the curing agent is a polyamine curing agent.

8. A method for coating a cargo tank, the method comprising:
coating the cargo tank with the coating composition of claim 7.

9. A method for coating a cargo tank, the method comprising:
coating the cargo tank with the coating composition of claim 1.

10. A cargo tank coated with the coating composition of claim 1.

11. The coating composition of claim 1, wherein at least one of the accelerators speeds up the homopolymerization reaction between the epoxy groups of the epoxy resins.

12. The coating composition of claim 11, wherein the curing agent is an amine curing agent.

13. The coating composition of claim 11, wherein the amount of curing agent present in the coating composition is such that the equivalent ratio of active hydrogens in the curing agent to the epoxy groups of the mixture of epoxy resins is between about 0.2 and 0.4.

14. The coating composition of claim 11, wherein the curing agent is a polyamine curing agent.

15. The coating composition of claim 11, wherein at least one of the accelerators speeds up the curing reaction between the epoxy groups of the epoxy resins and the functional groups of the curing agent having an active hydrogen.

16. The coating composition of claim 15, wherein the curing agent is an amine curing agent.

17. The coating composition of claim 15, wherein the amount of curing agent present in the coating composition is such that the equivalent ratio of active hydrogens in the curing agent to the epoxy groups of the mixture of epoxy resins is between about 0.2 and 0.4.

18. The coating composition of claim 15, wherein the curing agent is a polyamine curing agent.

19. A cargo tank coated with the coating composition of claim 18.

20. A method for coating a cargo tank, the method comprising:
coating the cargo tank with the coating composition of claim 15.

* * * * *